United States Patent
De Ruffray et al.

(10) Patent No.: US 8,136,754 B2
(45) Date of Patent: Mar. 20, 2012

(54) COMPACT STEERING DEVICE FOR THE LANDING GEAR OF AN AIRCRAFT

(75) Inventors: Paul De Ruffray, Toulouse (FR);
Rodolphe Morel, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 953 days.

(21) Appl. No.: 11/994,163

(22) PCT Filed: Jun. 22, 2006

(86) PCT No.: PCT/EP2006/063480
§ 371 (c)(1),
(2), (4) Date: Jun. 10, 2008

(87) PCT Pub. No.: WO2007/000411
PCT Pub. Date: Jan. 4, 2007

(65) Prior Publication Data
US 2009/0090810 A1 Apr. 9, 2009

(30) Foreign Application Priority Data
Jun. 28, 2005 (FR) ...................................... 05 51798

(51) Int. Cl.
*B64C 25/50* (2006.01)
(52) U.S. Cl. ...................................... 244/50; 244/103 R
(58) Field of Classification Search .................... 244/50, 244/100 R, 102 R, 103 R
See application file for complete search history.

(56) References Cited

U.S. PATENT DOCUMENTS

| | | | | |
|---|---|---|---|---|
| 2,189,094 A | * | 2/1940 | Weaver | 137/625.17 |
| 2,970,792 A | | 2/1961 | Holmes | |
| 2,988,056 A | * | 6/1961 | Rumsey | 91/54 |
| 3,001,741 A | * | 9/1961 | Rumsey | 244/50 |
| 3,099,424 A | * | 7/1963 | Hrusch | 244/50 |
| 3,226,061 A | * | 12/1965 | Dowty et al. | 244/50 |
| 5,086,994 A | * | 2/1992 | Donnelly et al. | 244/50 |

FOREIGN PATENT DOCUMENTS

| | | | |
|---|---|---|---|
| FR | 1334565 | * | 7/1963 |
| FR | 1334565 A | | 8/1963 |
| GB | 791101 A | | 2/1958 |
| GB | 1071474 A | | 6/1967 |
| GB | 1215552 A | | 12/1970 |
| GB | 2161123 A | * | 1/1986 |
| GB | 2161123 A | | 1/1986 |

OTHER PUBLICATIONS

International Search Report dated Dec. 10, 2006.
Written Opinion dated Dec. 10, 2006.

* cited by examiner

*Primary Examiner* — Joshua J Michener
(74) *Attorney, Agent, or Firm* — Perman & Green, LLP

(57) ABSTRACT

A steering device for a landing gear of an aircraft, including at least one actuator and at least one rack, located alongside the landing gear strut, outside and parallel to an upper tube of the landing gear. The steering device includes bevel pinions having a first conical pinion with an axis perpendicular to an axis of the landing gear strut and which meshes with a second conical pinion coaxial with a rotary annulus so that movement of the rack parallel to the strut is transferred to the annulus perpendicular to an axis of the landing gear through the bevel pinions having an axis perpendicular to the landing gear.

7 Claims, 2 Drawing Sheets

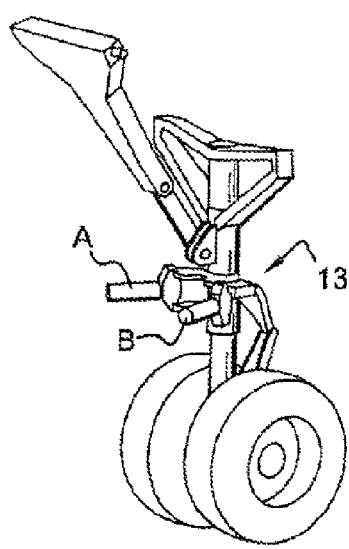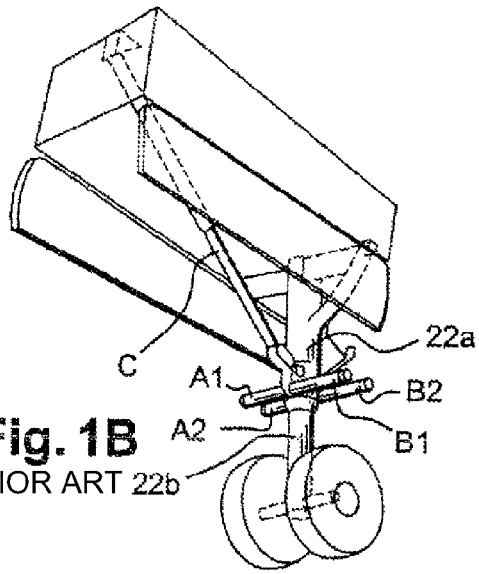
Fig. 1A
PRIOR ART
Fig. 1B
PRIOR ART
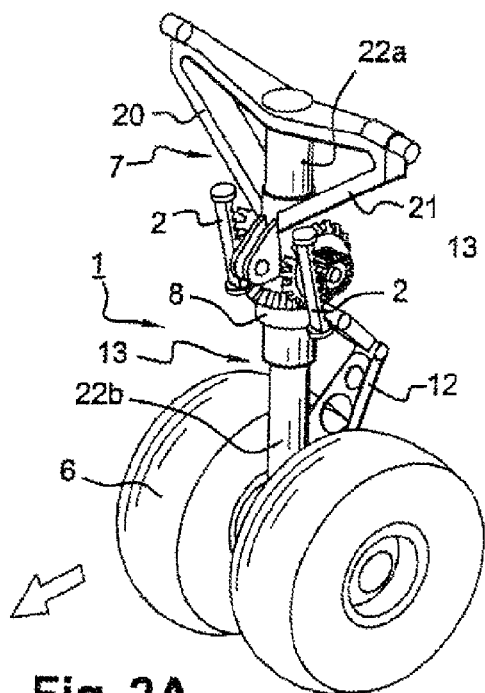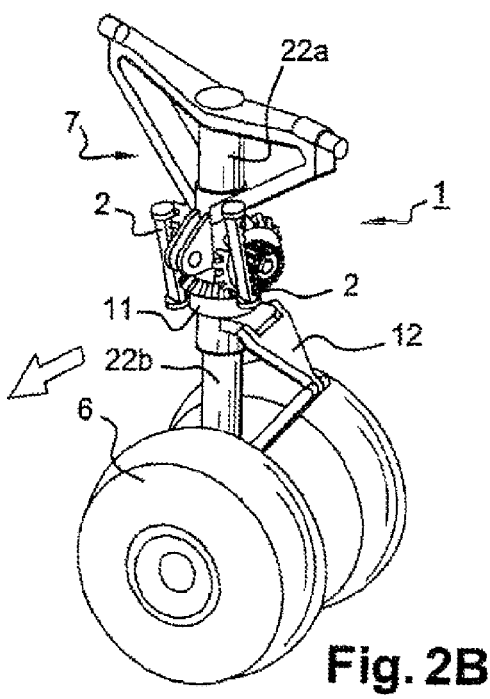
Fig. 2A  Fig. 2B

COMPACT STEERING DEVICE FOR THE LANDING GEAR OF AN AIRCRAFT

CROSS-REFERENCE TO RELATED APPLICATIONS

This application is the National Stage of International Application No. PCT/EP2006/063480 International Filing Date, 22 Jun. 2006, which designated the United States of America, and which International Application was published under PCT Article 21 (s) as WO Publication No. WO2007/000411 and which claims priority from, and the benefit of, French Application No. 05 51798 filed on 28 Jun. 2005.

BACKGROUND

The aspects of the disclosed embodiments relate to a compact steering device for the landing gear of an aircraft.

Steering devices for the landing gear of aircraft traditionally comprise actuators set at right angles to a landing gear strut and acting on the orientation of the strut of the front landing gear.

These actuators are fixed to the barrel containing this gear strut by an arm and are connected by pivots to an integral ring by means of torque links belonging to the turning lower part of the gear strut so as to cause the gear strut to turn. FIG. 1 shows an example of the prior art.

Besides the torque links, in these previous devices at least one connecting part—the actuators in the example—is located at right angles to the gear strut and extends beyond the gear strut. This part takes up a lot of room when housed in the landing gear well.

SUMMARY

The disclosed embodiments provide for reducing the size of the mobile steering device for the landing gear of an aircraft, in particular the front landing gear, so as to reduce the dimensions of the landing gear well in which this landing gear is housed.

For this purpose, the disclosed embodiments relate to a steering device for the landing gear of an aircraft comprising, located alongside the strut of the landing gear, at least one means for the turn maneuvering of the wheels of the landing gear.

The maneuvering means located alongside the landing gear strut advantageously comprises at least one actuator and at least one rack, the actuator actuating the rack.

More particularly, the rack, via bevel pinions, turns a rotary annulus which turns an extending leg to which the landing gear wheels are attached.

In one particular embodiment of the disclosed embodiments, the rotary annulus is coaxial with the landing gear strut and turns the wheels via a turning ring connected to torque links governing said wheels.

The steering device located alongside the landing gear strut does not therefore extend in a perpendicular direction beyond the strut and does not necessitate enlarging the gear well in a vertical and/or transverse direction to house it when the landing gear is retracted.

Other features and advantages of the disclosed embodiments will become apparent on reading the following description of an illustrative, non-restrictive embodiment of the disclosed embodiments with reference to the drawings, in which:

BRIEF DESCRIPTION OF THE DRAWINGS

FIGS. 1A and 1B are perspective views of landing gear fitted with prior art steering devices;

FIGS. 2A and 2B are perspective views of a landing gear equipped with the device of the disclosed embodiments, first straight and then turning;

DETAILED DESCRIPTION

Figure 3:
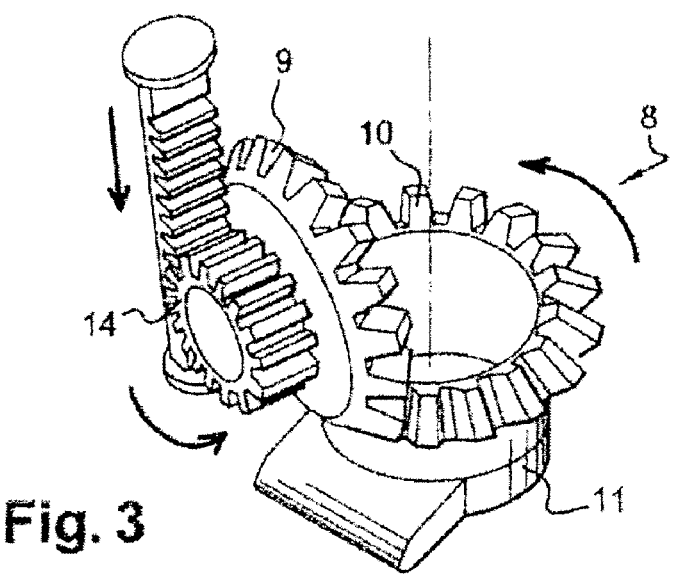
FIG. 3 shows a detail of the device of the disclosed embodiments in perspective.

FIG. 1A shows a front landing gear of an aircraft comprising a prior art steering device.

In this example the prior art device comprises two actuators A and B set perpendiclarly to the axis of the landing gear strut 13 and forming an angle with each other.

In the case of an aircraft of large mass and capable of turning on a short steering radius, the actuators are long in order to give sufficient operating travel.

When the landing gear is retracted into its landing gear well, the actuators extend beyond the landing gear proper in the upward direction. This increases its volume and therefore its mass and means that the well has to be made tall. This in turn reduces the amount of space available above this well.

The example in FIG. 1B is a landing gear fitted with a telescopic brace C and comprising actuators A1, A2, B1, B2 which extend sideways beyond the landing gear strut consisting of a barrel 22a and an extending leg 22b.

In this latter case the actuators take up a sizeable amount of room in the sideways direction.

To reduce the dimensions and mass of the landing gear well, it would be an advantage to reduce the size of the landing gear, as is provided by the disclosed embodiments by limiting the size of the parts extending beyond the landing gear strut.

The illustrative embodiment of the landing gear 1 of the disclosed embodiments shown in FIGS. 2A and 2B comprises for this purpose, located alongside the landing gear strut 13, two means 2 for the turn maneuvering of the landing gear wheels 6.

Connected to the upper fixed part 22a or barrel are strengthening triangles 20, 21, at the opposing vertices of which are the axes of rotation about which the landing gear retracts into and extends from its well.

The strengthening triangles 20, 21 and the barrel 22a can be made in one piece. The triangles 20, 21 can also be separate components.

The upper fixed part forms an upper tube 7, continuing on down from which is the movable part or extending leg 22b to which the wheels 6 are attached and which is mounted on a damper so that it can slide and rotate within the tube 7 of the barrel 22a.

The wheels are turned as in the prior art via torque links 12 which are turned by a turning ring 11 and which themselves turn the extending leg 22b in the barrel 22a.

The maneuvering means, located alongside the landing gear strut, here comprise two pairs of actuators 2, though a single actuator is also conceivable.

Figure 4:
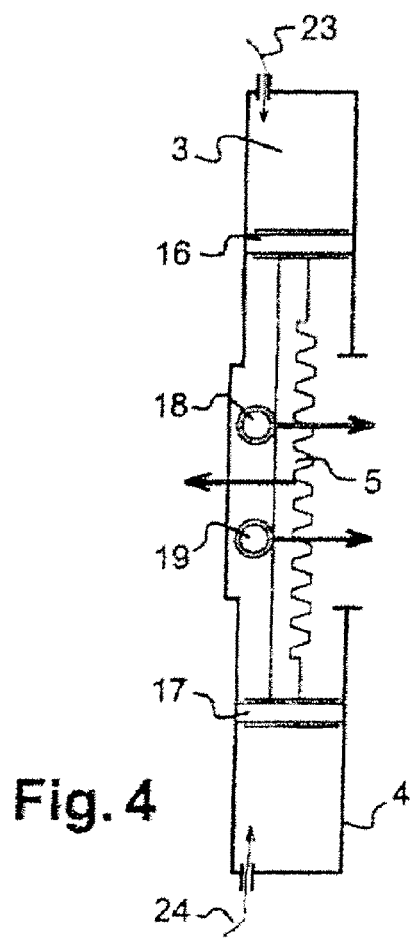
FIG. 4 is a diagrammatic view of an actuator and rack device in one particular embodiment of the disclosed embodiments.
Figure 5:
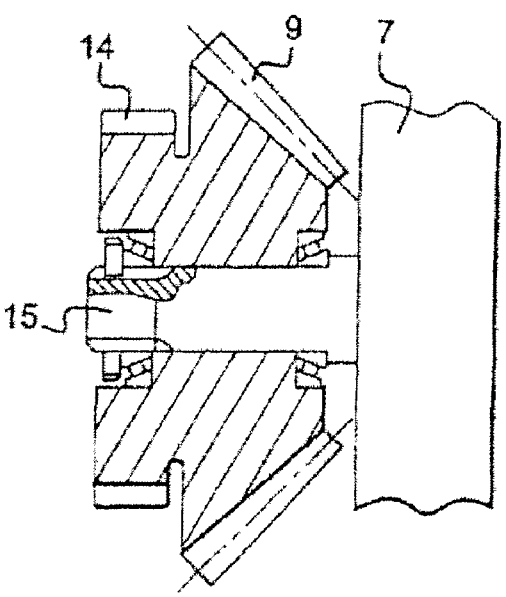
FIG. 5 is a cross section through a pinion system taken from FIGS. 2A and 2B.

In the detail view, FIG. 4, each actuator 2 consists of single actuators 3, 4 in opposition which are supplied by a dual hydraulic circuit 23, 24 and work in opposition. The actuators are located alongside and parallel to the upper tube 7 so as to extend as little as possible beyond the landing gear strut.

Between the self-opposing actuators 3, 4 is a rack 5, and the actuators actuate the rack. The actuator(s) 2, 3, 4 and the rack 5 are fixed to the upper tube 7 of the landing gear strut.

An embodiment with a single double-acting actuator driving a rack projecting from the actuator is conceivable in accordance with the disclosed embodiments for a light aircraft where the rotational forces on the wheels remain moderate.

To turn the wheels, the rack 5 turns a rotary annulus 8 shown in FIG. 3, and the annulus 8 turns the landing gear wheels 6.

The annulus is coaxial with the landing gear strut 13 and is turned by the rack via bevel pinions 9, 10.

The bevel pinions 9, 10 are conical pinions: pinion 9 turns about an axis perpendicular to the axis of the strut, and pinion 10 about the axis of the strut.

According to the disclosed embodiments, the rotary annulus 8 is formed coaxially with the turning ring 11 connected to the torque links similar to those of the prior art in such a way that the rack located parallel to the strut can turn the wheels 6 of the landing gear via the turning ring 11 connected to the torque links 12 which then turn the extending leg 22b.

The pinion 9, the pinion 10 and the turning ring 11 may be assembled components or may be machined in one piece.

As seen earlier, the bevel pinions 9, 10 comprise a first conical pinion 9 whose axis 15 is perpendicular to the axis of the landing gear strut and which meshes with a second conical pinion 10 coaxial with the annulus 8. The first conical pinion 9 is formed in a part comprising a spur pinion 14, and the rack 5 meshes with the spur pinion 14 which is coaxial with the first conical pinion 9.

The actuator 2 comprises two actuators in opposition 3, 4 and the rack 5 is formed in a common central rod between the pistons 16, 17 of the two actuators in opposition 3, 4 arranged one above the other.

Thus, when the hydraulic fluid pushes the piston 16 of the upper actuator 3, the rack descends and turns the first conical pinion 9 about the axis 15, causing the annulus 8 and the ring 11 to turn in a first direction, whereas when the hydraulic fluid fills the cavity underneath the piston 17 of the lower actuator 4, the rack rises and turns the annulus 8 in the opposite direction.

To avoid bending of the central rod carrying the rack, this rod bears against at least one guide roller 18, 19 located on the opposite side of the rack from the spur pinion 14.

The disclosed embodiments are not limited to the examples illustrated and in particular a single maneuvering means, such as a rotating electric motor with a conical output pinion of vertical axis meshing directly with the second conical pinion connected to the annulus, located alongside the strut 13 of the landing gear 1, can replace the assembly of the actuator, rack and first conical pinion.

The disclosed embodiments also apply to a landing gear strut with or without a telescopic brace.

The invention claimed is:

1. A steering device for a landing gear of an aircraft, wherein said device comprises, located alongside a strut of the landing gear, at least one means for turn maneuvering of wheels of the landing gear, comprising at least one actuator and at least one rack, said actuator actuating said rack which, via bevel pinions, turns a rotary annulus which turns an extending leg to which the landing gear wheels are attached, and wherein said at least one actuator and said rack are located alongside the landing gear strut, outside and parallel to an upper tube of said landing gear, said bevel pinions comprising a first conical pinion whose axis is perpendicular to an axis of the landing gear strut and which meshes with a second conical pinion coaxial with said rotary annulus so that movement of the rack parallel to the strut is transferred to the annulus perpendicular to said axis of the landing gear through the bevel pinions having an axis perpendicular to the landing gear.

2. The device as claimed in claim 1, wherein the rotary annulus is coaxial with the landing gear strut and turns the wheels via a turning ring connected to torque links governing said wheels.

3. The device as claimed in claim 1, wherein the landing gear strut comprising an upper tube said actuator and rack are fixed to said upper tube.

4. The device as claimed in claim 1, wherein the rack meshes with a spur pinion which is coaxial with the first conical pinion.

5. The device as claimed in claim 1, wherein said actuator comprises two actuators in opposition and in that the rack is formed in a common central rod between the pistons of two actuators in opposition.

6. The device as claimed in claim 5, wherein the central rod bears against at least one guide roller.

7. A steering device for a landing gear of an aircraft, comprising, located alongside a strut of the landing gear, at least two means for turn maneuvering of wheels of the landing gear, comprising at least two actuators and at least two racks, said actuators actuating said racks which, via bevel pinions, turn a rotary annulus which turns an extending leg to which the landing gear wheels are attached, wherein said actuators located alongside the landing gear strut are located alongside and parallel to an upper tube of said landing gear, and said bevel pinions comprise a first conical pinion whose axis is perpendicular to an axis of the landing gear strut and which meshes with a second conical pinion coaxial with the annulus and wherein said actuators each actuating a rack are working in opposition.

* * * * *